United States Patent
Haley

(10) Patent No.: US 6,780,311 B1
(45) Date of Patent: Aug. 24, 2004

(54) APPARATUS FOR SUPPORTING A WATER FILTER INTAKE

(76) Inventor: Thomas L. Haley, 03450 Pleasant Valley Rd., Boyne City, MI (US) 49712

( * ) Notice: Subject to any disclaimer, the term of this patent is extended or adjusted under 35 U.S.C. 154(b) by 0 days.

(21) Appl. No.: 10/104,543

(22) Filed: Mar. 22, 2002

(51) Int. Cl.⁷ .................................................. E03F 3/04
(52) U.S. Cl. ....................... 210/162; 210/170; 210/541; 405/127
(58) Field of Search ................................ 210/162, 170, 210/460, 541, 542; 405/127

(56) References Cited

U.S. PATENT DOCUMENTS

| | | | | |
|---|---|---|---|---|
| 705,364 | A | * | 7/1902 | Kurtz .......................... 210/170 |
| 1,094,310 | A | * | 4/1914 | Deal ........................... 210/170 |
| 1,274,121 | A | * | 7/1918 | White .......................... 210/162 |
| 1,451,394 | A | * | 4/1923 | Hurst .......................... 210/162 |
| 3,120,491 | A | | 2/1964 | Kincaid |
| 3,291,313 | A | | 12/1966 | Davis |
| 3,722,686 | A | | 3/1973 | Arnett et al. |
| 4,152,264 | A | | 5/1979 | Hanna, Sr. |
| D253,422 | S | | 11/1979 | Smith |
| 4,883,588 | A | | 11/1989 | Primavera et al. |
| 4,998,847 | A | | 3/1991 | Thurber |
| 5,152,637 | A | * | 10/1992 | Wayne ........................ 405/127 |
| 5,392,806 | A | | 2/1995 | Gallant |
| 5,795,473 | A | | 8/1998 | Marks |
| 5,947,640 | A | * | 9/1999 | Connors ...................... 405/127 |
| 6,076,994 | A | | 6/2000 | Brockway et al. |
| 6,200,484 | B1 | | 3/2001 | McInnis |

* cited by examiner

Primary Examiner—Christopher Upton
(74) Attorney, Agent, or Firm—John K. McCulloch

(57) ABSTRACT

Apparatus for supporting a water filter inlet in a body of water at a level between the bottom and the surface thereof and in such position as to enable water to enter a conduit via the filter inlet and pass through a conduit to a site on land. The filter inlet support has a frame which occupies an upright position and is provided with stabilizers which prevent movement of the support due to currents and the like.

14 Claims, 2 Drawing Sheets

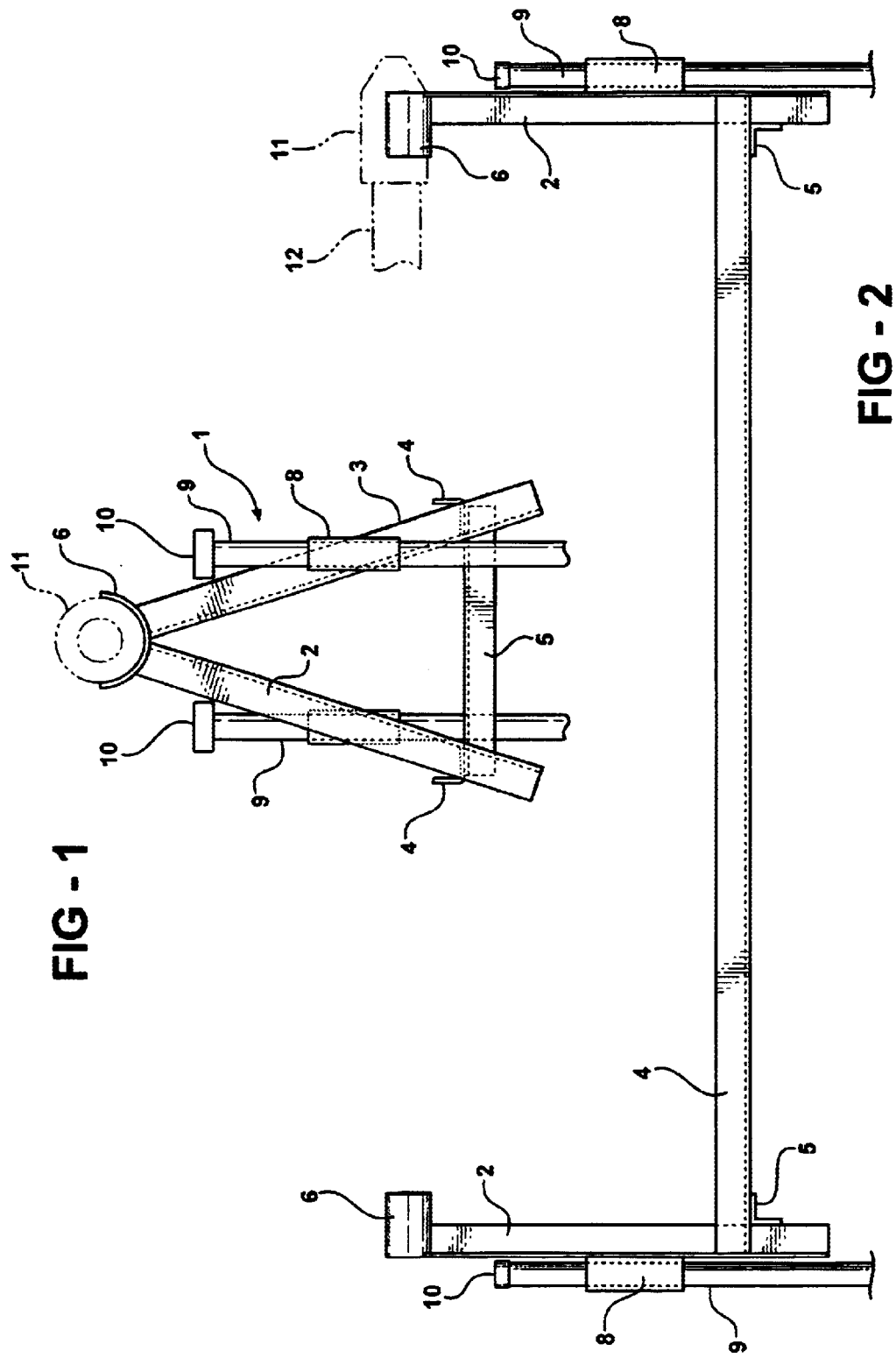

FIG - 3
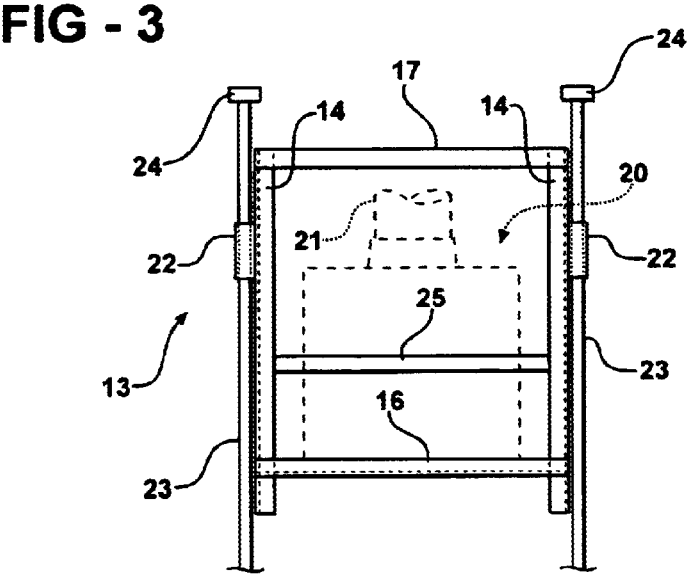
FIG - 4
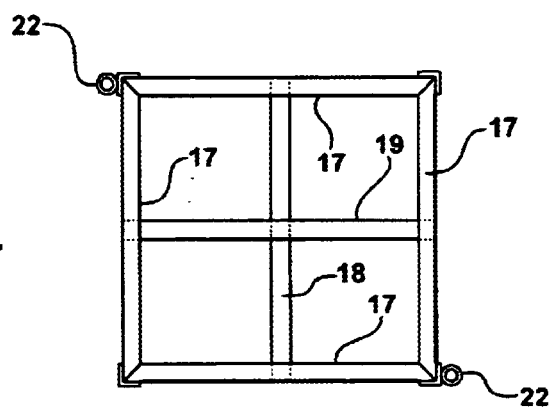
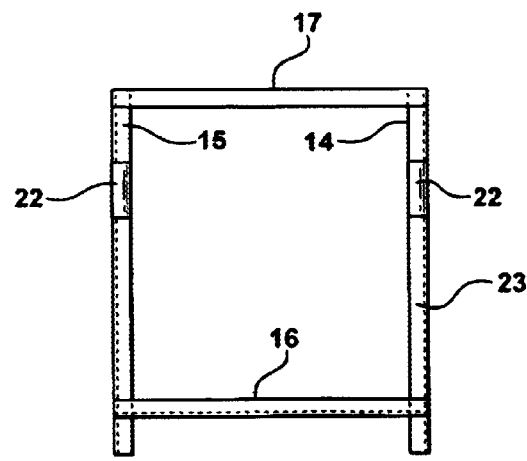
FIG - 5

APPARATUS FOR SUPPORTING A WATER FILTER INTAKE

This invention relates to apparatus for supporting a water intake filter in a body of water and at a level between the bottom of the body of water and the surface thereof.

BACKGROUND OF THE INVENTION

It is common practice to withdraw water from a lake or a stream for irrigation or other purposes. The apparatus usually includes a conduit extending from shore into the body of water. The conduit conventionally is coupled at one end thereof to a pump and at the other end to a filter which is immersed in the water so as to be submerged at all times. The filter conventionally is designed to prevent undesirable debris such as stones, twigs, marine life, and the like from entering the inlet end of the water conduit, but it is possible for sand and other sediment to pass through the filter into the conduit. Particularly is this true in those instances in which the filter occupies a position close to the bottom of the body of water.

The undesirability of entraining sand and other sediment with the water introduced to the conduit has been recognized heretofore. Various kinds of equipment have been proposed in an effort to minimize the entry of sand and the like into the conduit via the filter intake. However, the equipment proposed heretofore has had certain shortcomings, such as awkwardness of installation, an inability to stabilize the inlet filter against undesirable movement due to currents and the like, and, in some instances, inconvenient withdrawal of the conduit in those instances in which removal is desirable for one reason or other.

An object of the invention is to provide a support for an inlet water filter which overcomes the disadvantages of known constructions adapted for similar purposes.

SUMMARY OF THE INVENTION

A filter intake support according to one embodiment of the invention has a frame provided at each end with a pair of downwardly diverging legs and connectors extending between the pairs of legs for rigidifying the frame. At the upper ends of the pairs of legs is at least one support for a filter intake that is coupled to a conduit which also may be supported by the frame. The lower ends of the legs may rest upon the bottom of the body of water so that the filter intake is supported at a level above the bottom, but well below the surface of the water, thereby minimizing the intake of sand and other sediment which normally lies at the bottom. The frame is provided with a pair of vertically oriented guides in each of which is a stabilizer post which can be moved vertically in a direction to embed the lower ends of the posts deeply into the bottom, thereby providing a stable placement of the supporting frame which resists movement in response to currents and the like.

The stabilizer posts have enlargements at their upper ends which facilitate vertical movements of the posts relative to the frame. The enlargements also are of such size as to preclude downward movement of the posts a distance sufficient to cause the posts to clear the lower ends of the guides.

Another embodiment of the invention provides a rectangular frame having an upper railed support for a filter intake which is of canister configuration. The supporting frame has downwardly extending legs which may engage the bottom and stabilizing posts of the kind described earlier.

THE DRAWINGS

The presently preferred embodiments of the invention are disclosed in the following description and in the accompanying drawings, wherein:

FIG. 1 is a fragmentary, end elevational view of one embodiment of the invention;

FIG. 2 is a fragmentary, side elevational view of the embodiment shown in FIG. 1;

FIG. 3 is a fragmentary, end elevational view of a second embodiment;

FIG. 4 is a top plan view, with certain parts omitted, of the embodiment shown in FIG. 3; and FIG. 5 is an end elevational view, with certain parts omitted, of the embodiment shown in FIG. 3.

THE PREFERRED EMBODIMENTS

Apparatus according to one embodiment of the invention for supporting a water filter intake is illustrated in FIGS. 1 and 2 as comprising a supporting frame 1 having two pairs of downwardly inclined legs 2 and 3 joined by a pair of horizontal, parallel connectors 4 and crossbars 5. At their upper ends the legs 2 and 3 of each pair are secured to a saddle-shaped, arcuate, upwardly concave support 6. In end elevation the legs 2 and 3 of each pair present a substantially inverted vee configuration. The lower end of each of the legs 2 and 3 is free so as to be capable of being thrust into the bottom of a stream, lake, pond, or other body of water. Preferably, the connectors 4 and the crossbars 5 are at such level relative to the free ends of the legs 2 and 3 as to limit the extent to which the legs may be embedded in the bottom.

Supported on one or other of the legs 2 of each pair is a vertical guide 8 through which slideably extends a stabilizer post 9. The lower end of each post 9 may be squared or pointed, as desired. At the opposite end of each post is an enlargement 10 which facilitates, vertical movements of the post and prevents such post from passing completely through the guide 8 and separating from the remaining structure.

The supporting frame 1 is adapted to accommodate in one of the supports 6 a filter inlet 11 of known kind and to which is connected one end of a conduit 12 which, although not shown, also is supported in the other support 6 and extends therefrom to a pump (not shown) on shore.

In use, the frame 1 is located in a body of water with the lower ends of the legs 2 and 3 firmly seated on or embedded in the bottom. The filter inlet 11 and the conduit 12 then may be laid in the supports 6 which partially embrace them. The depth at which the frame 1 is immersed in the water should be such that the inlet 11 is sufficiently far above the bottom as to minimize the possibility that sand and silt may enter the conduit 12 via the inlet. However, the inlet also should be at a sufficient distance below the surface of the body of water that the inlet will not be dislodged by a passing boat or other craft.

Once the frame is positioned at a suitable site, the stabilizer posts 9 may be pushed downwardly so as to imbed the lower ends of the posts in the bottom. By embedding the posts in the bottom the frame and the inlet will be maintained in a stable position so as not to be affected by currents even when the speeds of such currents vary.

To remove the filter inlet and the conduit from the frame it is a simple matter to lift them from the supports 6, following which the posts 9 may be raised from their embedded positions in the bottom. The enlargements 10 facilitate such upward movement of the posts. Following the adjustment of the posts the entire frame, the filter inlet 11, and the conduit 12 may be removed from the water.

The embodiment shown in FIGS. 3–5 is similar in many respects to the previously described embodiment. The second embodiment comprises a frame 13 having spaced pairs of upright legs 14 and 15 joined by upper and lower connectors 16 and 17. To the lower connectors 16 are secured additional connectors 18 and 19 which form a base for a canister-type filter inlet 11a to which may be coupled a conduit 21 in known manner. In this embodiment the lower ends of the legs 14 and 15 extend below the lower connectors 16, 18, and 19 so as to be capable of being embedded to a limited extent in the bottom of a body of water.

Secured to suitable ones of the frame members 14 and 15 are tubular guides 22 through which stabilizing posts 23 slideably extend. The lower ends of the posts may be squared or pointed and the upper ends are provided with enlargements 24 in the same manner as has been described in connection with the first embodiment.

The manner of placing the frame 13 on the bottom of the body of water is the same as has been described earlier. The frame should be placed in a generally upright position so as to minimize the possibility that the filter inlet will be displaced. However, such displacement positively can be prevented by the provision of additional horizontal connectors 25, as shown. Once the frame has been positioned in the manner previously described the stabilizing posts 23 may be moved downwardly and embedded in the bottom so as to stabilize the position of the frame and the filter inlet in the manner previously described.

In each of the disclosed embodiments the materials from which the filter inlet supporting apparatus is formed are sufficiently rigid and resistant to deterioration due to exposure to water as to ensure a lengthy useful life. Suitable materials include aluminum, steel, galvanized iron, and rigid plastics.

The disclosed embodiments are representative of presently preferred embodiments of the invention, but are intended to be illustrative rather than definitive thereof. The invention is defined in the claims.

I claim:

1. Apparatus for supporting a water filter intake in a body of water at a level below its surface and above its bottom, said apparatus comprising filter intake support means for supporting a filter inlet at said level; a frame for supporting said support means; and stabilizing means carried by said frame and slideably extendable beyond said frame in a direction to be embedded in said bottom while said filter intake is supported at said level.

2. The apparatus according to claim 1 wherein said filter intake support means comprises a support member having an upwardly concave surface for at least partially embracing said filter intake.

3. The apparatus according to claim 2 wherein said support member is cylindrical.

4. The apparatus according to claim 2 wherein said support member is arcuate.

5. The apparatus according to claim 1 wherein said stabilizing means comprises at least one post slideably supported by said frame for movement relative to said frame in a direction toward the bottom of said body of water a distance to embed one end of said post in said bottom.

6. The apparatus according to claim 5 including guide means carried by said frame for guiding said post during said movement.

7. The apparatus according to claim 6 wherein said frame in a direction laterally of said frame.

8. The apparatus according to claim 5 wherein said guide means comprises a cylindrical sleeve open at opposite ends thereof.

9. The apparatus according to claim 8 wherein said post extends beyond said opposite ends of said sleeve and has an enlargement at its upper end which precludes passage of said upper end through said sleeve.

10. Apparatus for supporting a water filter intake in a body of water having a surface and a bottom and at a level below the surface and above the bottom, said apparatus comprising a frame having at each of two opposite ends a pair of supporting legs; connectors joining one pair of said legs to the other pair of said legs, thereby coupling said pairs of legs to one another; at least one filter intake support carried by said frame in such position as to locate said intake at said level when the pairs of supporting legs rest upon said bottom; at least one stabilizer guide carried by said frame; and at least one stabilizer post assembled with said guide for vertical adjustment relative to said frame and embedment in said bottom.

11. The apparatus according to claim 10 including one of said stabilizer guides at each end of said frame and one of said stabilizer posts in each of said guides.

12. The apparatus according to claim 10 wherein each pair of said supporting legs is in inverted vee form.

13. The apparatus according to claim 10 including two of said filter intake supports each of which comprises an arcuate, upwardly concave, saddle-shaped member.

14. The apparatus according to claim 10 wherein said filter intake support comprises a cylindrical tube.

* * * * *